Sept. 6, 1938.  T. G. FREDERICK  2,129,467
LOOPED FILM MOTION PICTURE PROJECTOR
Filed July 19, 1934   3 Sheets-Sheet 1
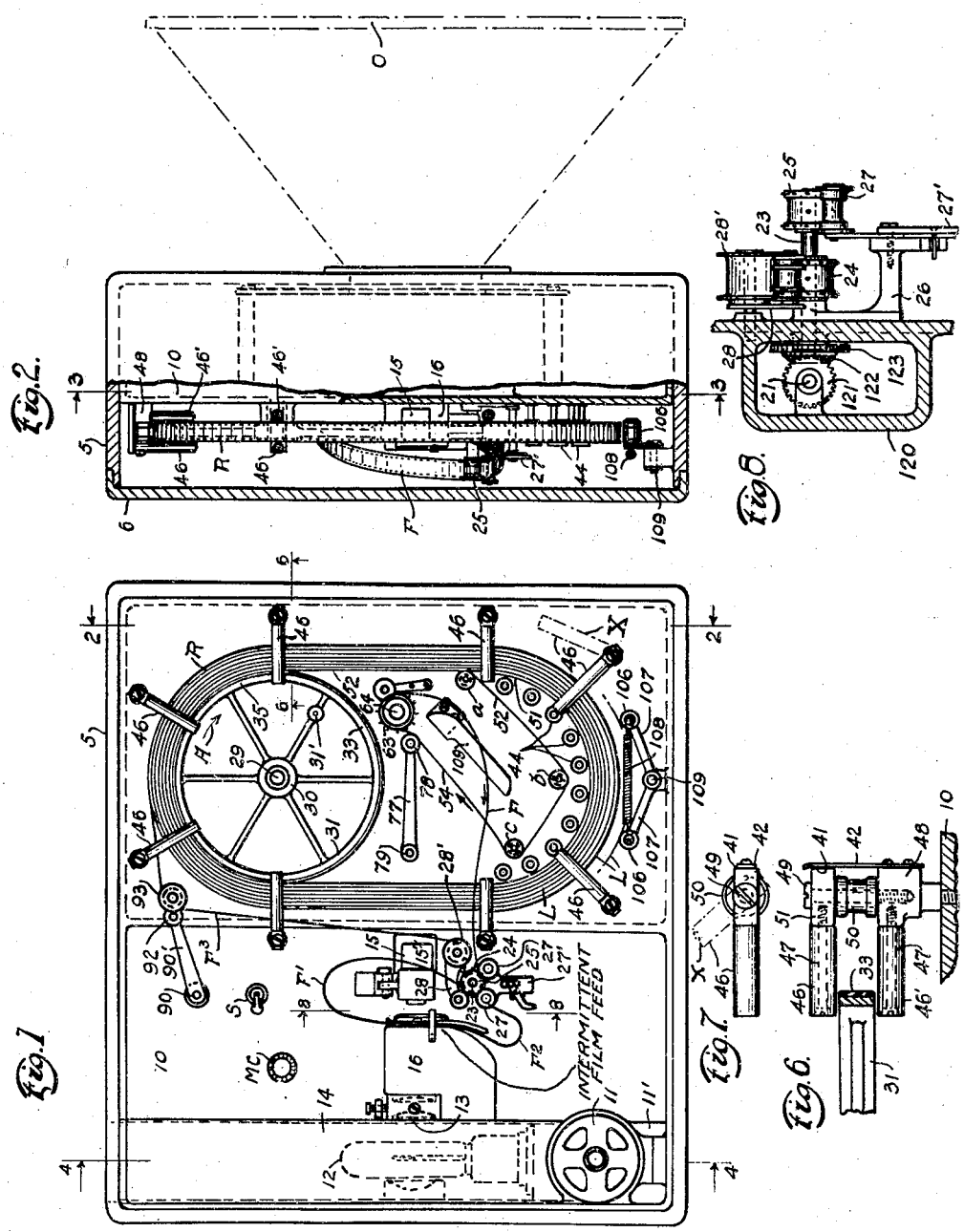
INVENTOR
Tilghman G. Frederick;
BY
Harold D. Penney,   ATTORNEY Sept. 6, 1938.     T. G. FREDERICK     2,129,467
LOOPED FILM MOTION PICTURE PROJECTOR
Filed July 19, 1934      3 Sheets-Sheet 2
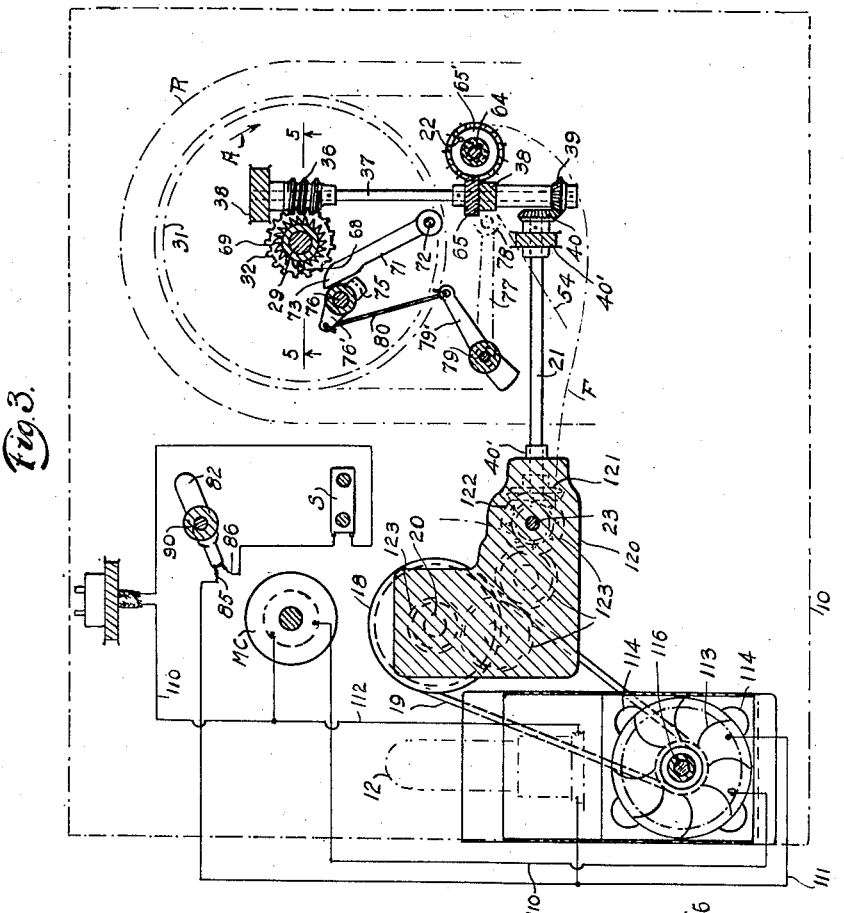
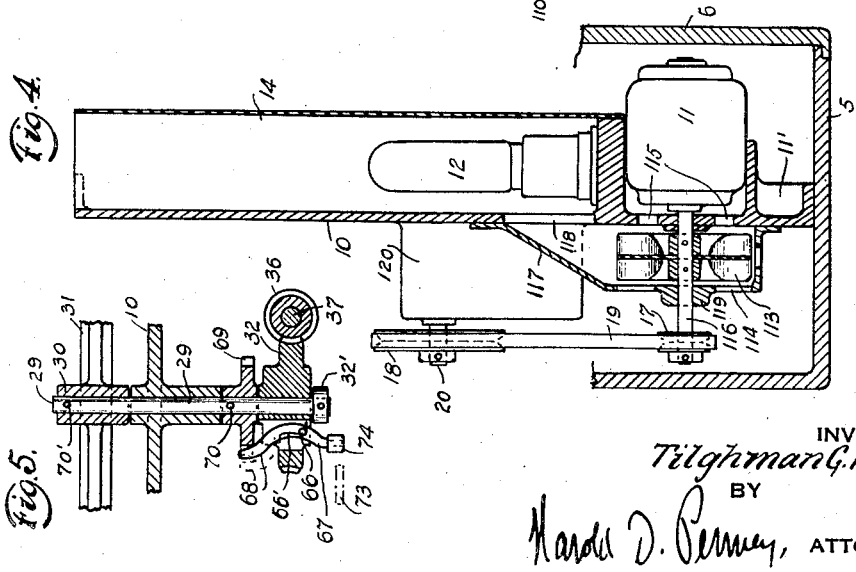
INVENTOR
Tilghman G. Frederick,
BY
Harold D. Penney, ATTORNEY.

Sept. 6, 1938.   T. G. FREDERICK   2,129,467
LOOPED FILM MOTION PICTURE PROJECTOR
Filed July 19, 1934   3 Sheets-Sheet 3
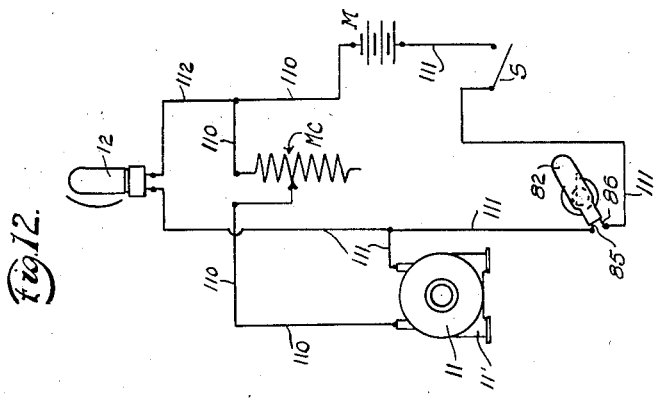
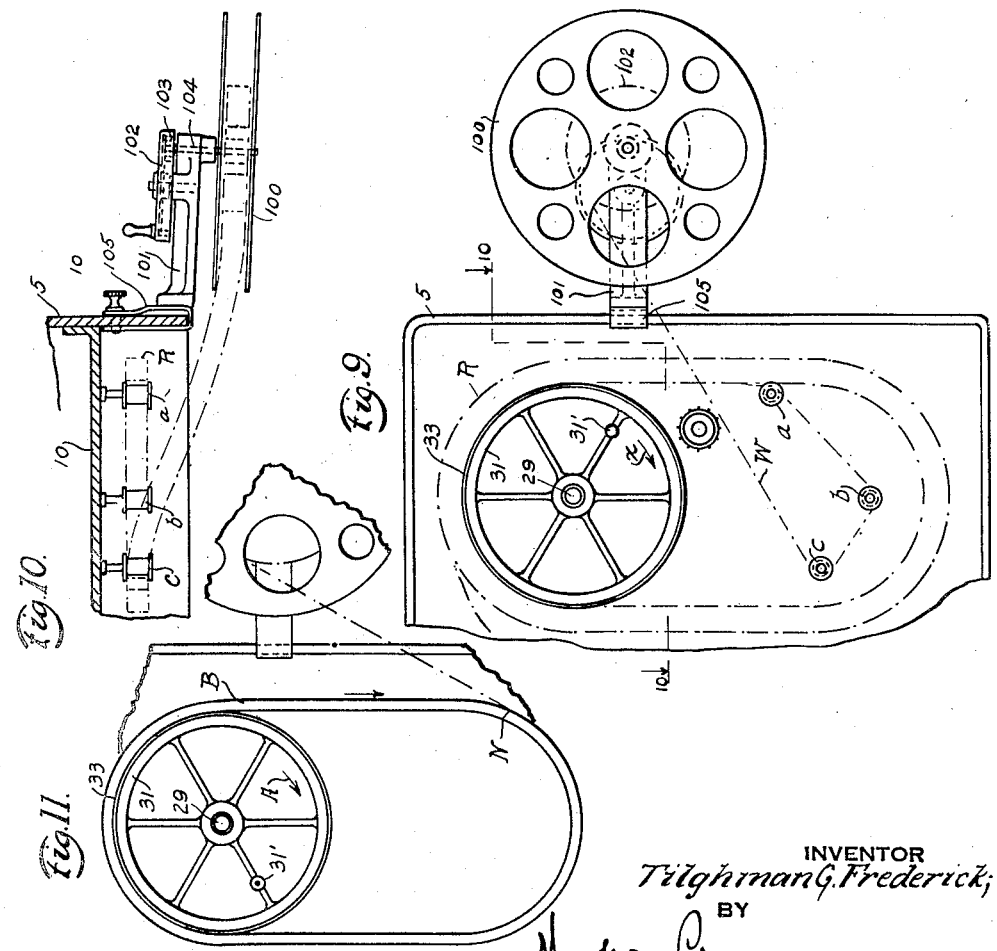
INVENTOR
Tilghman G. Frederick,
BY
Marsta D. Cenney, ATTORNEY.

Patented Sept. 6, 1938

2,129,467

UNITED STATES PATENT OFFICE 2,129,467

LOOPED FILM MOTION PICTURE PROJECTOR

Tilghman G. Frederick, Orange, N. J.

Application July 19, 1934, Serial No. 735,990

9 Claims. (Cl. 88—18.7)

The present invention relates to improvements in motion picture projecting machines and has for its main objects the provision of a small and portable projector, for household or advertising use, although not thus limited, in which desirable free and continuous running of the machine is secured, together with continuous or endless film operation. In many respects the structure herein is similar to the structure shown in the U. S. Pat. No. 1,968,250 of Frederick and Wooden, issued July 31, 1934, for Continuous projecting motion picture machine, and is an improvement thereover.

To this end, and in order to secure another object of the invention, the present structure includes mechanism for freely suspending the film in a vertically hung, endless loop, which is elongate in form, by its upper loop end and is substantially freely mounted from an upper rotatable support, and which film includes multiple layers or superposed turns, whereby to contain several hundred feet of film in a freely feedable position for concurrent continuous and intermittent feeding.

The film loop includes, separate from and continuous with its body or main portion, of a single ply, turn or portion, and a further object of the invention is to so dispose these portions for easy mounting in the projection apparatus, and for the joining of their ends after mounting, so that the multiple layers or body of the loop may first be placed in position independently of the single ply, following which the latter may be conveniently formed, prior to joining the film ends as aforesaid.

One feature of the invention is a looped film supporting driven wheel, with a frictional film engaging surface, for the aforesaid looped film; and another feature is a plurality of spaced, anti-friction film carriers, to facilitate relatively free and frictionless movement of the outer multiple layers of the looped film. Continuous with the outer ply of these layers is a film portion which, before being joined to the end of the single ply, and also during operation, cooperates with an intermittent film feed mechanism of known type, which is actuated by an internally mounted electric motor.

Since the film loop drive wheel engages the film frictionally, while the outer multiple ply portion, at one of its sides, adjoins the said intermittent feed mechanism, this arrangement is effective to remove the main friction load from the film at the point where the latter cooperates with the light, active, intermittent film drive portion of the projector, thus relieving the intermittent drive of all load except the portion of the film in the projector head, this being to secure an additional object of the invention.

A still further object is to provide a new drive means whereby the body of the looped film or the outer layers may be driven continuously at a uniform speed, while its adjoining portion, that is to say the portion of film in the projecting mechanism, and actuated thereby, may be driven intermittently at a speed relatively uniform to the uniform speed of the loop.

Additional objects are the provision of driving means whereby all the film driving elements may be driven from the internally housed motor by a substantially unitary drive means; and also of film control means in connection with the drive means between the outer portion of the loop and the motor whereby overrunning of said loop may be prevented.

A further object of the invention is the provision of a method and means for initially mounting or dismounting the film into and out of the loop form, from, or to a standard reel, so that the film may be carried to, or removed from a projector, on a standard reel and the film thus easily handled, transported and installed in the machine.

With the above indicated objects in view, and others which shall hereinafter appear, the invention resides in certain novel constructions and arrangements of parts, the essential features of which are herein clearly described, and fully illustrated in the accompanying drawings, in which:

Fig. 1 is an elevational view of the apparatus, in which the cover of the housing is removed showing the projector mechanism and film guiding means;

Fig. 2 is an end elevation taken on the line 2—2 of Fig. 1, looking in the direction of the arrows, the housing being partly broken away;

Fig. 3 is an elevational view taken on the line 3—3 of Fig. 2, looking in the direction of the arrows, showing the drive mechanism and the electrical control units;

Fig. 4 is a fragmental sectional view taken on the line 4—4 of Fig. 1, looking in the direction of the arrows, showing the lamp house and the motor driven air lamp house ventilator;

Fig. 5 is an enlarged horizontal sectional view of the clutch mechanism taken on the line 5—5 of Fig. 3, looking in the direction of the arrows;

Fig. 6 is an enlarged plan view of the film guide rollers taken on the line 6—6 of Fig. 1, looking in the direction of the arrows;

Fig. 7 is an elevational view of Fig. 6, showing one of the upper film guide rollers, movable, outwardly, as illustrated by dot and dash lines;

Fig. 8 is a vertical section taken on the line 8—8 of Fig. 1, looking in the direction of the arrows, showing the projector feed sprockets;

Fig. 9 is a fragmental front elevational view showing the method of winding the looped film back on a reel to remove film;

Fig. 10 is a sectional view taken on the line 10—10 of Fig. 3, looking in the direction of the arrows;

Fig. 11 is a fragmental elevational view showing the method of feeding the film back into the apparatus, to form an endless loop thereon from the reel; and Fig. 12 is a wiring diagram of the electrical control units.

Similar references refer to corresponding parts throughout the several views.

The film loop feed wheel

In this particular apparatus it has been found advantageous to rotatably support a vertically looped film on a single wheel 31, which is rubber faced on its outer face, as at 33, Figs. 9 and 11, to create a suitable amount of traction for moving the entire film over the top of the said wheel, continuously, while a portion of the film is fed through the projector intermittently.

The housing and partition

This apparatus comprises a housing, generally denoted by 5, with a removable cover 6, shown in section, Fig. 2, the said housing being adapted to securely hold an interiorly located, flanged partition 10, upon which all of the operating mechanism is mounted, this partition being located in the mid-portion of said housing.

The included mechanism comprises an electric motor 11, adapted to drive a cooling fan 113, Fig. 4, a series of gears and shafts, a film carrying wheel, film sprockets, a projector lamp, a projector head and an optical system. The apparatus also comprises a removable screen, film feed control means and motor speed control.

The partition 10 and its mountings, which are easily manipulable as a unit, may be placed with said mountings uppermost to receive any quantity of film, in the present instance, about 400 feet, arranged in the form of an endless loop or reel R, which is shown in Figs. 1 and 2.

The electric circuit

The operation of the apparatus will now be briefly explained, and, by referring to Figs. 1 and 12, it will be noted that, by closing the switch S, current flows through the wires 110 to the motor 11 and through the wires 110 and 112 to the lamp 12 and through the wires 111 to the source of current not shown, which causes the motor and lamp to operate. Resistance, such as MC, Fig. 12, has been provided for the motor circuit to control the speed of the motor, and a mercury switch 82 has been provided for both circuits, which will hereinafter be fully explained.

Film mounting and control

By referring to Figs. 1 and 3 it will be clearly understood, that as the motor 11 operates the gear train and shafts, the wheel 31 is caused to slowly and continuously rotate in the direction of the arrow A, Fig. 3, supporting and rotating the full load of looped film R, and feeding the inner loop of film 52, Fig. 1, down to a set of guide rolls a, b and c which are located interiorly of the loop R. The inner single ply loop 52 of film is then guided by these rolls and then carried over a continuously rotating, toothed feed sprocket 63, Fig. 1, and over a cam film edge guide 109, which tends to offset the film outward from the loop interior by contacting with the film edge as at F, Fig. 2, the film being then guided to a toothed feed sprocket 25 and then carried upward, forming a loop F1, Fig. 1, and then down through the gate of the projector and forming another loop F2 and then upward and over an inner toothed feed sprocket 24, as shown in Fig. 8, and under a guide roller 28', then upward as at F3 and over a guide roller 93, to form the outer loop of the film.

While the apparatus is in operation it will be understood that the film is being carried through the projector head 16 by a contained, intermittent mechanical film feeding movement of known construction, which is not shown, while the peripheral speed of the wheel 31 and its film loop is constant and of an amount equal in footage to the speed of the feed of film through said intermittent movement; likewise, the continuous, peripheral speed of the said sprockets 24 and 25 equals the film feed speed and footage of the intermittent movement.

Film slack sensing control

Should the speed of the film loop R vary, for some reason or other, causing the film section 52—54, Fig. 1 to become too slack, there is provided a sensing and control arm 77, pivoted by a shaft 79 on partition 10, and roller 78, on the free floating end of said arm, which roller is supported by the taut film section 54, in a normally horizontal position and which drops downward when the film section 54, becomes excessive, thus throwing out an actuating clutch driving means, shown in Fig. 5, of the looped film supporting driven wheel 31, Fig. 5, and this clutch member will later be explained in detail.

Loop control

In order to form a complete inside structure for the novel and free running loop monitoring arrangement, when the film loop R is mounted on the traction feed wheel 31, guide rollers 44 are rotatably supported on studs secured to the said partition 10, in the particular embodiment of the invention here selected for disclosure, the said rollers being arcuately positioned in the path of the inside face of lower loop L, and at a distance below the wheel 31, and within the interior confines of the lower portion of the loop L and are adapted to guide the inner face of the loop of film, and as shown in Fig. 1, and serve to keep the loosely contacted portions of the suspended lower loop in orderly arrangement and under the control of the edge guide rolls 46. The guide rollers 44, normally, barely contact with the inside face of loop R.

In radial position with the wheel 31 and the said rollers 44, are located a plurality of cylindrical edge guide rollers 46 adapted to traverse and guide the opposed edges of the film loop R. The said cylindrical rollers are composed of fixed inner and movable outer rollers as 46 and 46', Fig. 6, as shown in Figs. 1 and 7, and are rotatably supported by fixed studs 47 which are secured to posts 48, the said posts being secured to the partition 10. It will be noted referring to Fig. 6 that the inner roller 46' is intended to remain fixed in its radial position, while the outer roller 46 is so constructed as to swivel, so as to be moved out of the zone of the film loop, as shown in dot and dash lines, as at X, in Figs. 1 and 7, to allow a new film to be loaded onto, or removed from the wheel 31, which loading will hereinafter be explained in detail. The swivel rollers 46 are pivotally held to the post 48 by a stud screw 49 and spaced from the fixed lower roller 46' by a roller 50 which is rotatably mounted upon and held by the said stud screw 49. Referring to Fig. 6, it will be seen that the stud 47 of the outer roller 46 is secured in a block 51 having a flat outer edge 41, thus being adapted to be engaged by the free end of a flat spring 42 affixed to the end of post 48 and which tends to keep the said roller 46 in or out of radial position.

If for any reason the lower loop L, of the looped film R due to accumulated slippage, becomes too large and drops to dotted position L' a pair of rollers 106 is provided and adapted to support the extended loop, and prevent it from dragging and causing friction. The said rollers 106 are supported by link arms 107, which are pivoted at 109, by a base, to the bottom of the housing and the rollers 106 are held in a resilient outstretched loop engaging position by a spring 108 connected therebetween.

As thus described, it will be seen that the loop portion L is associated with and is adjacently surrounded by rolling surfaces which relieve all friction, and monitor the film loop during operation.

The clutch release

Mounted at the rear of partition 10, Fig. 5, is located a shaft 29, which rotates in the hub of partition 10, and to which is affixed, by a pin 70', the film feed wheel hub 30 of continuously driven film loop wheel 31, which is located on the front face of partition 10.

A worm gear 32, Fig. 5, is rotatably mounted on shaft 29, at its rear end, and is held in position by a pinned collar 32' and an affixed ratchet wheel 69, which is pinned to shaft 29, by pin 70. The worm wheel 32 is slotted through and in the slot is pivotally mounted by pin 66, a curved clutch arm, one end, 67, of which extends from the front face of worm wheel 32, and carries a roller 74, the other rear end 68 of the clutch arm extending beyond the rear face of the worm 32 and cooperating to engage and disengage with the teeth of the ratchet wheel 69. A small wire spring 66' cooperates to normally constrain arm end 68 into driving engagement with the ratchet teeth of wheel 69.

The worm wheel is in driven engagement with a driven worm 36, fixed to shaft 37, Figs. 3 and 5, so that upon revolution of shaft 37, through the connections above noted film feed wheel 31 is constantly driven. The vertical shaft 37, Fig. 3, is mounted in bearings 38—38, on the rear face of partition 10. The lower end of shaft 37, Fig. 3 mounts a fixed bevel gear 39, this in turn meshes with a bevel gear 40 fixed on shaft 21, said shaft being revolvably mounted in bearings 40'—40', one of which is also affixed to the rear wall of partition 10, and the other bearing being located in the end of housing 120, Figs. 3 and 8. Bevel gear 121 meshes with bevel gear 122 fixed on shaft 23, and through the medium of a train of spur gears 123 which are driven by shaft 20, which in turn is driven by the belt 19 and sheave 18 by the motor 11.

The clutch release operating means

To actuate the clutch arm 67—68 of Fig. 5, the rear face of the partition 10 mounts a pivot 72, Fig. 3, upon which is pivotally mounted a lever 71, having the cam faced end 73. This end, as in Fig. 5, cooperates, as shown dotted, to move clutch arm 67—68 out of driving connection with the ratchet wheel 69, to release loop film wheel 31 from further drive, upon the inadvertent loosening of the film section 54, Fig. 1.

A cam lever 75, pivoted on a pivot 76', which is affixed to the rear face of partition 10, has an offset cam ledge 76, shown dotted in Fig. 5, and this is operated in turn by a connecting rod 80 to the free end of a lever 79' which is fixedly connected to the shaft 79, upon which control lever 77, Fig. 1, is connected.

Thus when lever 77, shown dotted in Fig. 3, follows the rise and fall of film 54 as it tightens or loosens, its motions operate to let clutch 67—68 in or out of the ratchet wheel 69, to connect or disconnect the drive wheel 31, until the looseness of film sections 54 has been eradicated.

By the above noted structure the film 54 is kept fairly taut, during running. If for any reason film section 54 becomes too loose and sags to any appreciable extent, the roller 78 and arm 77, follow the sag, which operates to throw out clutch 67—68 until the film 54 is again tightened, when the clutch reengages the film as previously described.

The unitary drive means

The means for driving the various elements of the projector are as follows:

An internally mounted electric motor 11 is provided with a sheave 17, Fig. 4, affixed to its shaft 116. This sheave is connected to a larger sheave 18, which is mounted on a shaft 20, Figs. 3 and 4, by a driving belt 19.

Thus, shaft 20, which is the main drive shaft of the gears in gear transmission housing 120, of known construction, and which supports a train of gears 121—122—123 shown in Fig. 8, and dotted in Fig. 3, and in which gear 121, which is a bevel gear drives shaft 21. Shaft 21 supports on its other end a bevel gear 40, this in turn meshes with bevel gear 39 which is affixed to vertical shaft 37, Fig. 3, and drives the same.

Shaft 37 has affixed thereto a mitre gear 65, and this in turn drives mitre gear 65', this latter gear being affixed to shaft 64, which drives feed sprocket 23, Fig. 1.

Vertical shaft 37, at its upper end, Fig. 3, has affixed thereto a worm 36, this in turn meshing with and driving worm wheel 32, Fig. 5, to thus actuate the clutch means through shaft 29, shown in Fig. 5, as previously described.

Gear 122, which is a bevel gear and meshes with bevel gear 121, Fig. 3, is mounted on shaft 23 together with spur gear 123, shown dotted, and shaft 23 passes through and extends into the front chamber of the housing and is connected to constant feed sprockets 24 and 25, which are affixed to shaft 23.

It will thus be seen that from the motor 11, all driven parts are unitarily driven by fixed drives from gear transmission shaft 20.

The film-monitoring means 44, 46 and 106 loosely barely engage the edges of the film and the inner and outer faces of the loop at the lower part of the loop. This allows the loop to hang freely loosely to allow the entrance of air between the film layers to adhere to the film to provide lubrication between the layers. This lubrication remains between the layers because the outer face of the upper end of the loop is free of loop-squeezing contact with rolls or other structure, and the wheel 31 is large enough in diameter in relation to the stiffness and size of the loop to engage the loop throughout about half the smooth frictional periphery 35, the periphery being wide enough and smooth enough to engage the film continuously from side to side throughout half the periphery, thereby supporting the loop continuously and smoothly over a large area, so that the pressure against each portion of said area is so small that said lubrication is not squeezed from between said layers, but remains to separate and lubricate said layers at the upper part of the loop, to facilitate and make easy the movement of the layers against each other as the diameter of the looped portion of the layer decreases as the film moves from the outer to the inner face of the loop, thereby to relieve the strain and wear on the film, thereby to minimize breakage and wear and make long the life of the film in constant use.

Safety stop control of unitary drive means

In the event that the film breaks during operation of the projector, it becomes necessary to stop the mechanism, and this is provided for, as follows;

As in Figs. 1 and 3, there is mounted to partition 10, a shaft 90, which on its front end, Fig. 1, carries a rock-arm 90'. The outer end of arm 90' carries thereon a feeler roll 92, which rests against a section F3 of the film just below the film idler roll 93. As thus shown in Fig. 1, arm 90' is held up by the taut film as it feeds onto the loop R at the top thereof. Should the film break after leaving film idler roll a, as soon as the broken end reaches idler 93, the arm 90', drops, by gravity, rotating shaft 90. The rear end of shaft 90, Fig. 3, carries a mercury level switch tube 82, in which ends the two wire terminals 85—86 of the motor and lamp circuits end, Figs. 3 and 11. When the mercury switch 82 is moved by the dropping arm 90, the circuit from electric source M is broken and the motor and lamp are cut out of circuit.

Repair of the film and the rethreading thereof through the machine, restores arm 90 to circuit closing position.

The electric circuit

As diagrammatically shown in Fig. 12, a circuit having a current source M, comprises a lead 111, broken by a manual switch s and a normally closed safety mercury level switch 82 previously described. Lead 111 connects to one pole of the motor 11 and one contact of lamp 12. Lead 110 connects from the opposite side of source M to the other pole of the motor 11, through an adjustable resistance MC. This latter may be adjusted to control desired speed of motor. Lamp 12 is connected by its other pole to source M by a lead 112. Thus the motor 11 is controlled by resistance MC and the lamp by the safety mercury level switch 82.

Lamp and motor cooling

As the lamp 12 is shown in Fig. 4, it is located in a separate well formed by wall 14, Figs. 1 and 4, which may be screened at the top, for ventilation, not shown.

As in Fig. 1 the lamp is mounted to the motor support 11', above the motor and a cover 117, enclosing and supporting a fan 113 on motor shaft 116 guides air from the motor and fan up through duct 118 cut into partition 10 past lamp 12 Ducts 115 in front of motor 11, and ducts 114 permit air to be drawn past motor 11 and from the rear of partition 10 by fan 113.

Removing and replacing film

After a film has been operating in the apparatus for a period of time it may be desirable to change to another film and subject, therefor means have been provided whereby this may easily be accomplished.

As in Figs. 9, 10 and 11 there is shown an ordinary take-up film reel 100 supported by a bracket 101 which is affixed to an edge of wall 5 of the housing by a holder 105, Fig. 10. The bracket 101 rotatably supports a hand wheel housing 102 which is internally toothed and meshes with an internally mounted pinion 103, thereby driving a shaft 104 which in turn removably supports and operates the take-up reel.

To remove a looped film from the apparatus it is only necessary to remove the film from the projector head 16, the feed sprockets 24—25 and 63, and by breaking the film and fastening the free end W of the inside loop, shown in Fig. 9, to the said reel, the film may then be wound by hand upon the reel.

To replace a film, the cylindrical rollers 46 must all be turned out of the way as shown by the dot and dash lines X, Figs. 1 and 7, and as in Fig. 11, an endless leather belt B, is provided which is placed over the wheel 31, the free end of the reeled new film is then attached to the outside of the said belt, and, by a handle 31' provided on the wheel 31, Figs. 9 and 11, the wheel 31 may then be turned in the direction of the arrow A, Fig. 11, which will cause the film to unwind from the reel, and loop itself upon the belt in the apparatus. When all the film is fed onto the belt, the endless leather belt may be removed from under the film, leaving the looped film with the proper amount of slack for satisfactory operation. The free inside and outside ends of the loop may then be cemented together and the endless film may then be threaded onto the sprockets 63, 25 and 24, and through the projector head 16, and the apparatus is again ready to operate.

The mode of attaching the film to the belt B as shown at N, Fig. 11, is to loop the film end around the belt by hand, by about one and one half or two turns, and this gives the film enough bight to be pulled around by the belt, as the handle 31' is manipulated.

In the manner above described a film many hundreds of feet in length may be easily and quickly removed or replaced.

Projection

Projection is accomplished by light passing through condenser lens 13, Fig. 1, shown dotted on wall 14, and thence through the film F'' in the frame on the projector mechanism 16, and from thence through a prism generally denoted by 15, Figs. 1 and 2, an aperture 15' cut into the partition 10 permits the picture to pass through the partition to the removable, enclosed picture screen O, shown in dotted outline at the rear of the projector housing 5, as in Fig. 2.

Having thus described the invention, what is claimed is:

1. The combination, in a moving picture projecting machine with a film feeding means, comprising and having an endless looped film, of a concurrently actuated continuous and intermittent film moving means; said continuous moving means comprising a rotatable supporting wheel of large diameter and wide smooth frictional periphery adapted to gravitationally suspend and feed the endless looped film by its upper loop end and a continuously actuated film driving sprocket located within the lower confines of said loop; the film moving means comprising a plurality of driven sprockets located exteriorly of said loop; one of said rotated sprockets being located offset from said other driving sprockets and from the edge plane of said loop, the others of said sprockets being located within the edge plane of said loop; a projection portion of said endless loop being fed from the lower interior of said endless loop to the upper exterior thereof; means for controlling and feeding said projection portion of said endless loop, including the said constant and film feeding sprockets and a plurality of film guiding rolls located within the lower portion of said endless loop; a film camming means located within the lower portion of said endless loop and adjacent said continuously actuated feeding sprocket, to cause said projection portion of said endless loop to be offset and to be aligned with said offset feeding sprocket; a film projecting means located adjacent said intermittent film feeding means adapted to project said projecting portion of said endless loop and a common drive means, including a motor, for simultaneously driving all of said film feeding and projecting means said machine being free of structure exerting exterior pressure on the film at said wheel, said supporting wheel alone entirely supporting all of said film.

2. Means for mounting or removing an endless looped film from a film supporting wheel, comprising a rotatable film reel spool holder; a rotatable film holding reel removably mounted on said spool holder; a film reeled thereon; means on said holder for manually rotating said reel; an endless belt as wide as the film and adapted to be mounted upon said film supporting wheel for rotation thereby and for engaging one end of a film upon said endless belt and means on said film supporting wheel for manually rotating the same to reel the film from said film reel to form a looped film upon said endless belt and film supporting wheel.

3. The method of transferring a moving picture film from a rotatable, reeled film spool to a film supporting wheel in a projecting machine, to form an endless loop thereon, consisting in providing an endless, removable looped film receiving belt on said film supporting wheel; then attaching one end of the reeled film from the rotatable spool to said endless belt; then rotating said film supporting wheel and thereby the endless belt to unreel the reeled film from said spool onto the said endless belt, to form a suspended film loop thereon; then joining the ends of the film loop so formed and finally removing the endless belt and leaving an endless film loop upon the film supporting driving wheel.

4. The method of transferring a moving picture film from a rotatable, reeled film spool to a film supporting wheel in a projecting machine, to form an endless loop thereon, consisting in providing an endless looped film spacing means on said film supporting wheel; attaching one end of the reeled film from the rotatable spool to said endless loop spacing means; then rotating said film supporting wheel and endless film spacing means to unreel the reeled film from said spool onto the said endless spacing means, to form a suspended film loop thereon; then joining the end of the film on the inner portion of the loop so formed to the end of the exterior loop so formed and finally removing the endless belt and leaving an endless film loop upon the film supporting driving wheel.

5. The method of transferring a moving picture film from a rotatable, reeled film spool to a film supporting wheel in a projecting machine, to form an endless loop thereon, consisting in securing one end of the film reel to said film supporting wheel, then rotating said film supporting wheel to unreel the reeled film from said spool onto the said film supporting wheel to form a suspended film loop thereon; then joining the end of the film on the inner portion of the loop so formed to the end of the exterior loop so formed thereby leaving an endless film loop upon the film supporting driving wheel.

6. The method of removing an endless looped film from a projecting machine having a film loop supporting wheel and a manually rotatable, film reel spool mounted thereon; which consists in breaking the endless looped film; attaching one of the broken ends of the film loop to said rotatable spool and then rotating said spool to unreel the film loop from said film supporting wheel to cause said film to be reeled upon said spool and then removing the reeled-up film and spool.

7. The method of removing an endless looped film from a projecting machine having a film loop supporting wheel and a rotatable film reel spool mounted thereon, which consists in breaking the endless looped film; attaching the broken end of the interior of the film loop to said rotatable spool, then rotating said spool to unreel the film loop from said film supporting wheel to cause said film to be reeled upon said spool and then finally removing the reeled-up film and spool.

8. In a moving picture projecting machine, in combination, a film supporting wheel having a smooth continuous frictional cylindrical peripheral face adapted to receive and support a vertically disposed endless loop of layers of film disposed in spiral form and around about half of the periphery and hanging a distance below the wheel; means for drawing film from the interior of the loop for feeding it through a projecting means and then feeding it to the exterior of the loop; monitoring means loosely engaging the inner lower part of the loop; drive means for driving said wheel to supply film to the first named means; the lower part of the loop hanging substantially free and slack to allow the entrance of lubricating air between the film layers to separate, and provide lubrication between, the layers; the outer upper end face of the loop being free of loop-squeezing contact with other structure; a thick flexible endless leather belt received on said wheel and adapted for engaging throughout about half the periphery and continuously from side to side, and passing under the monitoring means and to which the end of a picture film may be secured and fed at the upper outer face of the belt, whereby said belt, when driven by said wheel when driven by the drive means, will wind the film in said spiral form for joining its ends to form said endless loop, whereupon removal of said belt will leave the loop slack, for the reception of said lubricating air, said air remaining between the layers at the upper end of the loop, to separate said layers and facilitate and make easy the movement of the layers against each other.

9. In combination a machine having a film-supporting wheel having a smooth continuous frictional cylindrical peripheral face as wide as wide as the film and adapted to receive and support a vertically disposed loop of layers of film adapted to be disposed in spiral form and around about half of the periphery and loosely hanging a distance below the wheel; and monitoring means adapted to loosely engage the inner lower part of the loop; and a thick flexible belt as wide as said periphery and passing around said wheel, and under said monitoring means; and means for securing the end of the film to said belt.

TILGHMAN G. FREDERICK.